United States Patent Office 2,930,762
Patented Mar. 29, 1960

2,930,762

POLYVINYL COMPOUNDS AS LUBRICANTS IN PILLING OPERATIONS

Richard J. Schoenenberger, Park Ridge, Ill., assignor, by mesne assignments, to Universal Oil Products Company, Des Plaines, Ill., a corporation of Delaware No Drawing. Application August 8, 1957
Serial No. 676,923

8 Claims. (Cl. 252—430)

The present invention relates to the process of forming finely divided powder into pellets of definite shape and uniform size, and is specifically directed toward the utilization of polyvinyl compounds as lubricating and binding agents to improve the pelletability of such powder.

In the present specification and appended claims, the term "pellet" is construed to mean the product which results from the formation of a finely divided, powdered material into particles of definite shape and uniform size, regardless of the size and/or shape of said particles. Such particles are commonly referred to as pills, pellets, spheres, tablets, cakes, discs, briquettes, etc., and it is intended that the term "pellet" shall have reference to any and all such forms.

The advantages of using many various materials in the form of tablets, pills, etc. are well known in many commercial industries. Machines of various types have been developed to form pellets for use as candies, pharmaceuticals such as aspirin and other drugs, water color paints, abrasives, ceramic products, etc. These machines are designed to operate upon the principal of compression whereby the desired product, initially in some finely powdered state, is formed into pellets through the imposition of pressure in a confined zone.

Materials to be compressed into pellets usually require some simple treatment to facilitate proper formation and to insure efficient operation of the pilling machine. Generally, the material to be pelleted is in a finely divided powdered state, and such material is not easily pillable. Fine powders do not flow readily and tend to stick to the surfaces of the dies and punches of the machine. Often, the fine powder will entrap air, while flowing into the dies, and will result in weak pellets containing unsymmetrical channels, and having an extremely low crushing strength. The use of a suitable lubricating material, to retard the formation of gummed surfaces resulting from powder which adheres to the various parts of the pilling machine, is widely practiced. Well known lubricating agents are oils, waxes, fatty acids such as stearic acid, graphite, carbon black, talc, etc. Such lubricating materials also serve as binding agents to aid in the compressibility of the material.

Chemical industries, and particularly the petroleum industry, have found the use of pellets highly advantageous in the manufacture of catalytically active carrier material. Such material usually comprises a refractory inorganic oxide such as alumina, silica, zirconia, thoria, titania, boron oxide, mixtures of two or more, etc. After being formed into pellets the refractory inorganic oxide, for example alumina, is generally impregnated with other catalytically active substances such as noble metals, including platinum, palladium and iridium, other metals such as iron, cobalt, nickel, molybdenum, calcium, magnesium, sodium, potassium, etc., and metallic salts such as halides, nitrates, oxides, sulfates, sulfides, etc. Prior to the compositing of such catalytically active components, the alumina is generally subjected to a calcination treatment, effected at an elevated temperature, for the purpose of removing volatile impurities, particularly combined water and the lubricating and binding agent utilized in the formation of the pellet, and to produce a carrier material which exists in its most highly active and physically advantageous state.

An object of the present invention is to provide particular materials for utilization as lubricants and binding agents which induce improvements in processes for the formation of pellets.

Another object of the present invention is to provide particular materials, for use as lubricants and binding agents, which will produce pellets exhibiting no substantial loss in crushing strength after being subjected to a calcining treatment effected at elevated temperautres.

I have found that certain polyvinyl compounds, those selected from the group consisting of polyvinyl alcohol, polyvinyl acetal and polyvinyl esters, and especially polyviny alcohol, exhibit the physical characteristics required of a lubricating and binding agent. The binding power obtained through the use of the aforementioned polyvinyl compounds is not lost upon high-temperature calcination treatment, which effects the removal of the binding agent, and there is no substantial loss in crushing strength after such a treatment. In addition, the polyvinyl compounds are readily ground to a size which is comparable to that of the powder to be pelleted, creating thereby a homogeneous mixture which is free flowing and which will yield uniform pellets free from unsymmetrical channels, and which homogeneous mixture will not adhere to the dies and punches of the pilling machine, resulting thereby in an extended period of operation which is free from mechanical difficulties normally arising from loose punches, broken punches, gummed-up parts, etc.

In one embodiment, the present invention provides an improvement in the process of forming pellets from a finely divided powder, wherein a lubricant is employed to facilitate the pelletability of said powder, which improvement comprises intermixing said powder with a polyvinyl compound selected from the group consisting of polyvinyl alcohol, polyvinyl acetal and polyvinyl esters.

The present invention is especially advantageous in the manufacture of refractory inorganic oxide pellets which are extensively employed as catalytically active carrier particles in the manufacture of catalysts for use in the chemical and petroleum industries. As hereinbefore stated, the refractory inorganic oxide particles are often subjected to a high-temperature calcination treatment to impart thereto certain desired physical characteristics. Such high temperature treatment effects the removal of the particular binding agent employed, and the loss of such agent generally results in pellets which exhibit a considerable loss in crushing strength. The loss in crushing strength is detrimental to the eventual yield of catalyst particles, creating thereby undue expense in recovering costly catalytic components and the undue expense experienced in reprocessing the crushed pellets. The use of polyvinyl compounds, and particularly polyvinyl alcohol, results in pellets which experience no significant loss in crushing strength upon being subjected to a high temperature calcination treatment.

In another embodiment, the present invention provides an improvement in the process for manufacturing alumina pellets for use as catalytically active carrier particles, which improvement comprises intermixing finely divided alumina powder with from about 0.5% to about 6% by weight of polyvinyl alcohol, forming the resulting mixture into pellets and thereafter subjecting the pellets to a calcining treatment at a temperature in excess of about 930° F.

Another advantage afforded through the utilization of the method of the present invention is the ability to form pellets having an acceptable crushing strength from those substances which are inherently difficult, and often impossible, to subject to a pilling operation. For example, it is known that hydrated alumina exists in various physical modifications. These physical modifications are commonly referred to as gibbsite alumina, bayerite alumina and boehmite alumina, the last named existing as a monohydrate, whereas the gibbsite and bayerite modifications exist as alumina trihydrate. It is very difficult to subject the alumina trihydrate modifications to a pilling operation whereby a strong, uniform pellet is obtained, even though the material may contain one or more of the hereinbefore mentioned lubricants or any other commercial lubricant. An alumina powder containing in excess of 30% by weight of the trihydrate modification will yield pellets of very low crushing strength. These pellets are undesirable for utilization as a catalytically active carrier material to be composited with various other catalytic components. I have found that alumina powder containing in excess of 30% by weight of the trihydrate modification, when admixed with polyvinyl alcohol, can be readily formed into uniform pellets, having a crushing strength of about 12.0 p.s.i.

In a specific embodiment, the present invention provides an improvement in the formation of strong uniform pellets from an alumina powder containing from about 30% to about 60% by weight of the trihydrate modification of alumina, which improvement comprises intermixing said alumina powder with from about 0.5% to about 6% by weight of polyvinyl alcohol.

As hereinbefore stated, the polyvinyl compound may be employed in concentrations as low as 0.5% by weight of the total mixture comprising the finely divided powder and the polyvinyl compound. Higher concentrations of the polyvinyl compound may be advantageously utilized, but the concentration should not be in excess of that amount which is beyond economic feasibility. Concentrations of about 6% may be advantageously employed, and it is preferred that the concentration of polyvinyl compound is within the range of about 2½% to about 5% by weight of the total mixture which is subjected to the pilling operation. These concentrations will produce pellets having a crushing strength of about 12 p.s.i. and, when desired, it is possible to produce pellets having a crushing strength in excess of 20 p.s.i.

Polyvinyl esters have the general configuration given below:

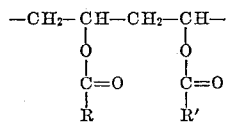

When a polyvinyl ester is employed, it is preferred that the chemical groups represented by R and R' be limited to straight chain hydrocarbons containing not more than five carbon atoms. However, the preferred polyvinyl compound for use in accordance with the method of the present invention comprises polyvinyl alcohol in an amount of from about 2.5% to about 5% by weight of the total mixture to be pelleted, although, as hereinbefore stated, concentrations as low as 0.5% may be employed to advantage.

The following examples are given for the purpose of further illustrating the utility of the present invention, and to indicate the benefits afforded through the utilization thereof. It is not intended to limit unduly the broad scope of the invention to the particular materials, concentrations and conditions employed therein.

All experimentation was performed on a standard, commercial type pilling machine, Arthur Colton #241 Rotary Press, having ⅛-inch dies with inserts set at approximately 0.1230 to 0.1240 inch.

*Example I*

One pound of polyvinyl alcohol was ground to approximately 100-mesh to facilitate intermixing with 19 pounds of alumina powder of commercial grade (manufactured by Filtrol Company). In a similar manner, 19 pounds of the alumina powder was commingled with one pound of a commercial lubricant and binding agent, Stearotex. The pilling machine was set to yield pellets having a crushing strength of approximately 12.0 p.s.i. The alumina-Stearotex mixture was formed into pellets which were subjected to a calcining treatment at a temperature of 1150° F. The crushing strength of the calcined pellets was determined to be 9.0 p.s.i.

Traces of the alumina-Stearotex mixture were removed from the machine, and the alumina-polyvinyl alcohol mixture was placed in the feed hopper. Without changing the settings, for crushing strength, the machine was placed in operation and immediately began to pound. The pilling operation was interrupted while the crushing strength of the pellets was determined. A crushing strength of greater than 23 p.s.i. was indicated, and it was necessary to decrease the amount of fill by approximately fifteen notches—still further adjustment of the fill was required in order to lower the crushing strength of the pellets to 12.0 p.s.i. At this setting, the pilling machine exhibited speedier operation, forming more pellets in a shorter period of time, and operated at a lower temperature than it had while pilling the alumina-Stearotex mixture. Also, there was visual evidence that the alumina-polyvinyl alcohol mixture was smooth flowing, did not adhere to the inclined portions of the feed hopper, uniformly distributed itself throughout the fill, and did not form a hard gummed material on the dies.

This example illustrates several advantages of utilizing polyvinyl alcohol as the lubricant and binding agent. There is afforded, through its use, an increase in pellet production, an increase in crushing strength of the pellets and smooth, rapid operation of the pilling machine.

*Example II*

An alumina powder containing 5% by weight of polyvinyl alcohol was placed in the feed hopper, and the pilling machine was set to produce pellets having a crushing strength of 16.0 p.s.i. This operation produced a raw (uncalcined) pellet having a crushing strength of 15.8 p.s.i. After calcination, effected at a temperature of 1150° F., the crushing strength of the pellets was 15.2 p.s.i.

This example illustrates the negligible loss in crushing strength after a high-temperature calcining treatment, which treatment is generally considered necessary when the pellets are subsequently employed as the catalytically active carrier material in processes for manufacturing highly active catalytic composites.

*Example III*

The dies, punches, and other tooling in the #241 Rotary Press were replaced. The pilling operation was begun on 18,450 pounds of Filtrol alumina powder containing 2.5% by weight of polyvinyl alcohol, and the machine was set to produce pellets having a crushing strength of 12.0 p.s.i. The material was completely pelleted in 37½ days, during which period there was experienced no operational difficulties due to broken dies, broken punches or punches which had worked loose from their setting. At the end of the operation, the machine was disassembled and all parts carefully inspected. There was no evidence of erosion of the dies or punches, and no evidence of gummed surfaces which tend to create unsymmetrical channels in the pellets. During the entire period of operation, the machine ran cool and did not appear to be laboring during those periods when the production rate was increased.

Example IV

Two pounds of Stearotex was admixed with 50 pounds of alumina powder containing 33% by weight of the trihydrate modification of alumina. This mixture was extremely difficult to form into pellets, and it was necessary to approach the maximum pilling pressure of the machine. The pellets which were eventually formed exhibited a crushing strength of only 4.0 p.s.i.

To 50 pounds of the alumina powder, containing 33% by weight of the trihydrate modification of alumina, was added two pounds of polyvinyl alcohol. The mixture was readily formed into pellets at normal operating machine pressure, and the pellets, after being subjected to a high-temperature calcination treatment effected at a temperature of 1150° F., exhibited a crushing strength of 12.0 p.s.i.

The foregoing examples clearly indicate the benefits to be afforded through the utilization of the present invention in the manufacture of uniform pellets from finely divided powdered material.

I claim as my invention:

1. In the process of forming pellets from a finely divided refractory inorganic oxide powder, wherein a lubricant is employed to facilitate the pelletability of said powder, the improvement which comprises intermixing said powder with from about 0.5% to about 6% by weight of a polyvinyl compound selected from the group consisting of polyvinyl alcohol, polyvinyl acetal and polyvinyl esters and compressing the resultant mixture into pellets.

2. The improvement of claim 1 further characterized in that said polyvinyl compound comprises polyvinyl alcohol.

3. The improvement of claim 1 further characterized in that said polyvinyl compound comprises a polyvinyl ester.

4. The improvement of claim 1 further characterized in that said polyvinyl compound comprises polyvinyl acetal.

5. In the process of forming alumina pellets from a finely divided alumina powder, wherein a lubricant is employed to facilitate the pelletability of said alumina powder, the improvement which comprises intermixing said alumina powder with from about 0.5% to about 6% of a polyvinyl compound selected from the group consisting of polyvinyl alcohol, polyvinyl acetal and polyvinyl esters and pelleting the resultant mixture.

6. In the process of forming alumina pellets from a finely divided alumina powder, wherein a lubricant is employed to facilitate the pelletability of said powder, the improvement which comprises intermixing said powder with from about 0.5% to about 6% by weight of polyvinyl alcohol, forming the resulting mixture into pellets and subjecting the pellets to a calcining treatment at a temperature in excess of about 930° F.

7. The improvement of claim 6 further characterized in that said calcining treatment is effected at a temperature within the range of from about 1000° F. to about 1600° F.

8. The improvement of claim 6 further characterized in that said alumina powder is intermixed with from about 2.5% to about 5% by weight of polyvinyl alcohol.

References Cited in the file of this patent

UNITED STATES PATENTS

| | | |
|---|---|---|
| 2,107,611 | Jarl | Feb. 8, 1938 |
| 2,479,451 | Young | Aug. 16, 1949 |
| 2,540,599 | Segura | Feb. 6, 1951 |